US009712697B1

(12) United States Patent
Gopalakrishnan et al.

(10) Patent No.: US 9,712,697 B1
(45) Date of Patent: Jul. 18, 2017

(54) DETECTING SIZES OF DOCUMENTS SCANNED USING HANDHELD DEVICES

(71) Applicant: Xerox Corporation, Norwalk, CT (US)

(72) Inventors: Sainarayanan Gopalakrishnan, Chennai (IN); Vignesh Doss, Theni (IN); Sudhagar Subbaian, Thondamuthur (IN); Dhevendra Alagan Palanivel, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/001,328

(22) Filed: Jan. 20, 2016

(51) Int. Cl.
G06K 15/02 (2006.01)
H04N 1/00 (2006.01)
H04N 1/393 (2006.01)

(52) U.S. Cl.
CPC ....... *H04N 1/0044* (2013.01); *H04N 1/00708* (2013.01); *H04N 1/00734* (2013.01); *H04N 1/00774* (2013.01); *H04N 1/393* (2013.01); *H04N 1/3935* (2013.01)

(58) Field of Classification Search
None
See application file for complete search history.

(56) References Cited

U.S. PATENT DOCUMENTS

| 4,575,769 A | 3/1986 | Arnoldi |
| 5,053,885 A | 10/1991 | Telle |
| 7,712,671 B2 | 5/2010 | Cattrone et al. |
| 7,953,441 B2 | 5/2011 | Lors |
| 8,610,935 B1 | 12/2013 | McKinley et al. |
| 8,902,454 B2 | 12/2014 | Liu et al. |
| 8,941,847 B2 | 1/2015 | Hilbert et al. |
| 2006/0284987 A1* | 12/2006 | Wolf, II ............... G06F 1/1632 348/220.1 |
| 2013/0287265 A1* | 10/2013 | Nepomniachtchi ........................ G06K 9/00442 382/115 |
| 2014/0368891 A1* | 12/2014 | Beato ................... G06T 7/0085 358/474 |
| 2015/0138609 A1* | 5/2015 | Golding ............. H04N 1/00541 358/447 |

FOREIGN PATENT DOCUMENTS

EP 1122716 A2 8/2001

* cited by examiner

*Primary Examiner* — Henok A Shiferaw
(74) *Attorney, Agent, or Firm* — Gibb & Riley, LLC

(57) ABSTRACT

An electronic document image of a document is captured using a camera of a handheld device. A user interface of the handheld device displays an instruction to place the handheld device on the document and to change the magnification of the electronic document image on the user interface until the electronic document image and the document are the same size. The handheld device automatically determines the original size of the document based on the magnification that made the electronic document image and the document the same size when the handheld device was on the document. The handheld device converts the electronic document image into an original size document image file based on the original size of the document.

20 Claims, 7 Drawing Sheets

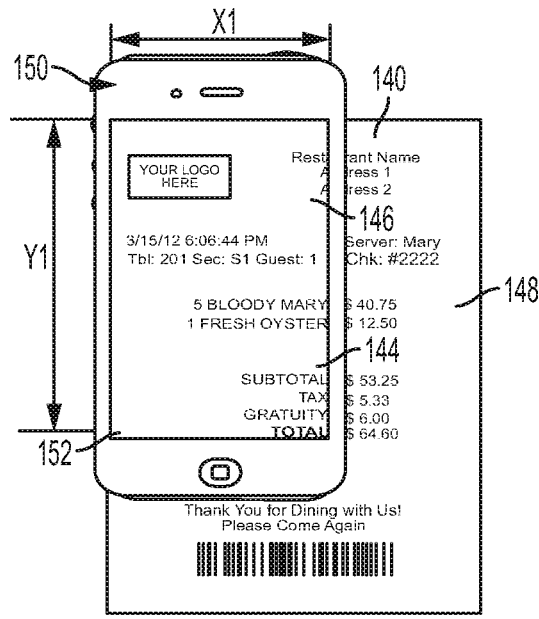
FIG. 9
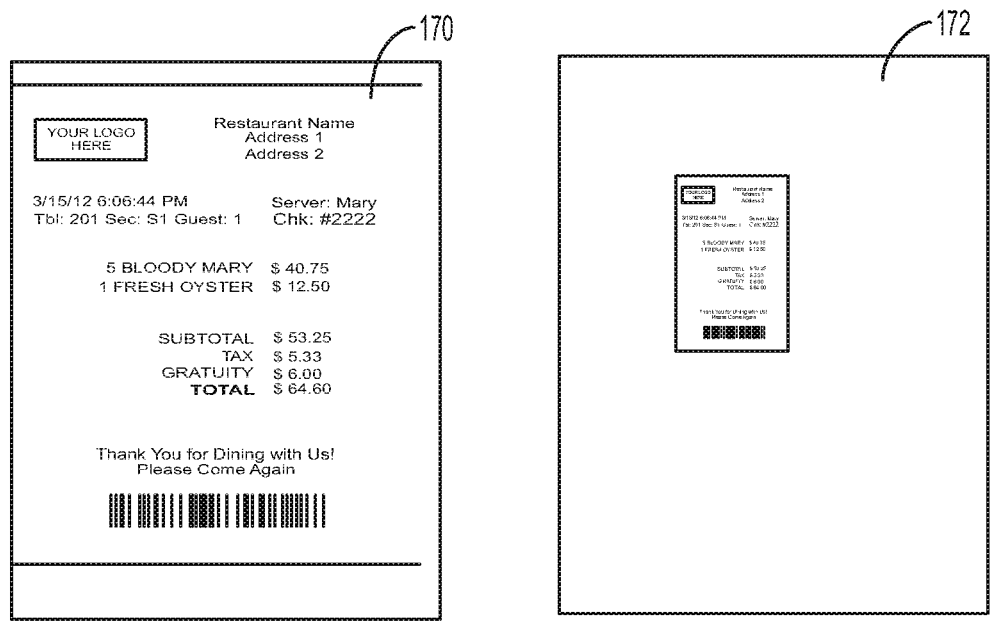
FIG. 10
FIG. 11

DETECTING SIZES OF DOCUMENTS SCANNED USING HANDHELD DEVICES

BACKGROUND

Systems and methods herein generally relate to using handheld devices (such as smart phones, small cameras, etc.) to scan documents, and more particularly to detecting sizes of documents scanned using such handheld devices.

Many portable and handheld devices are being manufactured to include cameras. Such cameras can be utilized for a number of purposes, including taking pictures and obtaining video. In addition, handheld and portable devices that include cameras can also be used as scanners when they take a picture of a document. This allows documents to be scanned by the handheld devices, so that the documents can be retained and/or potentially printed later, etc. In addition, the information within the documents can be recognized and analyzed using computerized processing such as optical character recognition (OCR) and data analysis programs.

SUMMARY

Exemplary methods herein record an electronic document image of a document captured using a camera of a handheld device. After recording the electronic document image, such methods cause the user interface to display the electronic document image and to display an instruction to define corners of the document in the electronic document image. After the corners of the document in the electronic document image are defined, these methods automatically crop the electronic document image to include only the document, using the processor.

Further, such methods cause the user interface of the handheld device to display an instruction to place the handheld device on the document and to change the magnification of the electronic document image on the user interface until the electronic document image and the document are the same size (note that this may cause the user interface to display less than all of the electronic document image).

These methods also automatically determine the original size (e.g., original dots per inch (DPI) size) of the document based on the magnification that made the electronic document image and the document the same size, when the handheld device was on the document (e.g., using a processor of the handheld device). Such methods convert the electronic document image into an original size document image file based on the original (e.g., DPI) size of the document, using the processor.

The original size document image file has the same (e.g., DPI) size as the document, and these methods can store the original-size document image file in a non-transitory, machine-readable electronic storage of the handheld device. Such methods can output the original size document image file from the handheld device to a printer to cause the printer to print the original size document image file to have the same size as the document.

Exemplary handheld apparatuses herein include, among other components, a processor, a camera operatively (meaning directly or indirectly) connected to the processor, a user interface operatively connected to the processor, a communication device operatively connected to the processor, etc. The camera captures an electronic document image of a document through user operation.

After the camera captures the electronic document image, the user interface can display the electronic document image and display an instruction to define corners of the document in the electronic document image. After the corners of the document in the electronic document image are defined, the processor can automatically crop the electronic document image to include only the document.

The user interface displays an instruction to place the handheld apparatus on the document and to change the magnification of the electronic document image on the user interface until the electronic document image and the document are the same size. Note that the user interface may display only a portion (less than all) of the electronic document image when the magnification of the electronic document image on the user interface is changed to make the electronic document image and the document the same size.

The processor determines the original size (e.g., dots per inch (DPI) size) of the document based on the magnification that made the electronic document image and the document the same size when the handheld apparatus was on the document. The processor converts the electronic document image into an original size document image file based on the original (e.g., DPI) size of the document.

Thus, the original size document image file has the same (e.g., DPI) size as the document. The processor can store the original-size document image file in a non-transitory, machine-readable electronic storage of the handheld device. Further, the communication device can output the original size document image file to a printer to cause the printer to print the original size document image file to have the same size as the document.

These and other features are described in, or are apparent from, the following detailed description.

BRIEF DESCRIPTION OF THE DRAWINGS

Various exemplary systems, devices, and methods are described in detail below, with reference to the attached drawing Figures, in which:

FIG. 9 is a schematic diagram illustrating devices and methods herein;

FIG. 10 is a schematic diagram illustrating output produced by devices and methods herein;

FIG. 11 is a schematic diagram illustrating output produced by devices and methods herein;

DETAILED DESCRIPTION

As mentioned above, many portable and handheld devices are being manufactured to include cameras, and such cameras can be utilized for a number of purposes, including scanning documents for storage for later processing.

Therefore, the devices and methods herein allow a user to scan and print the document, such as receipts, to their original size using a handheld device. If a user wants to scan document/receipts (non-standard size) through a handheld device and print the same closest to its actual size (100%), some methods can be very indirect. However, for standard size originals, the scanned images can be printed on the same size paper, after the devices and methods herein automatically determine the size of the scanned document.

Since the pixel dimension of a handheld device's camera is fixed based on image size selected by user or by the camera capability, the content dimension varies with distance between the handheld device and the original document. The resolution in terms of DPI is not stored in the scanned image header. This limitation restricts the handheld device from being used as 1:1 copy scanner (when used along with the printing device). However, the systems and methods described herein, allow the handheld device to estimate the DPI to be stored in the image header, so when the image is printed, the scale of the original document is provided.

Figure 2:
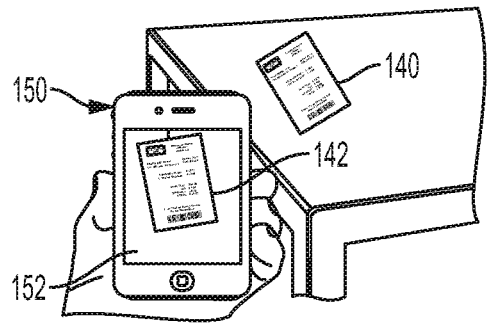
FIG. 2 is a schematic diagram illustrating devices and methods herein.

The following is discussed in greater detail below, but generally a document that is to be scanned is captured via the camera on the handheld device 150, as shown in FIG. 2. After cropping the scanned image to it boundaries (see FIGS. 3 and 4, discussed below) an image zoom option is provided to the user on the interface of the handheld device, as shown in item 164 in FIG. 7, discussed in detail below.

Figure 8:
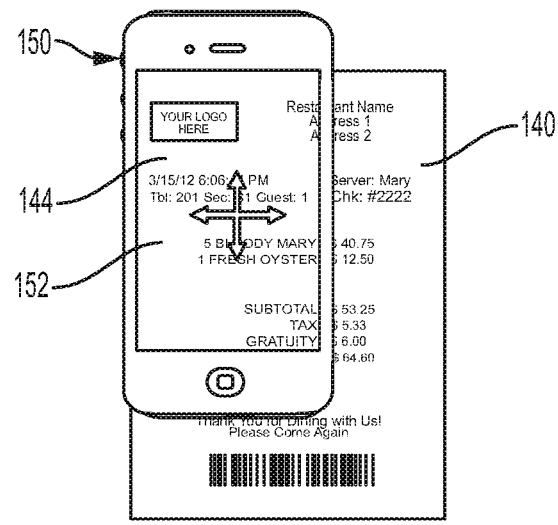
FIG. 8 is a schematic diagram illustrating devices and methods herein.

Having the handheld device 150 and actual document 140 at same distance of the user's vision (as shown in FIGS. 8 and 9, discussed below) the user will zoom onto a portion of the content in the scanned image until the image 144 matches the size of the portion of the content in the actual document 140. Once the sizes are matched, the user selects an option to store to the appropriate dots-per-inch (DPI) measure. In this processing, based on the ratio of the image displayed on the size of the screen, the actual size of the document is estimated; and, based on the actual dimension and the pixel dimension of the image, the DPI of the image is estimated and stored.

In one example, in FIG. 9 [X1, Y1] are shown as the physical dimension of the phone display in inches or millimeters. After zoom/resizing the number of pixels packed inside the visual region is taken and the calculated values of the DPI parameter are processed using X DPI=(Number of Pixel displayed within X1)/X1 and Y DPI=Number of Pixel displayed within Y1)/Y1. Thus, the system and methods determine the DPI for a captured image in both horizontal and vertical directions for printing the image to actual size.

Figure 1:
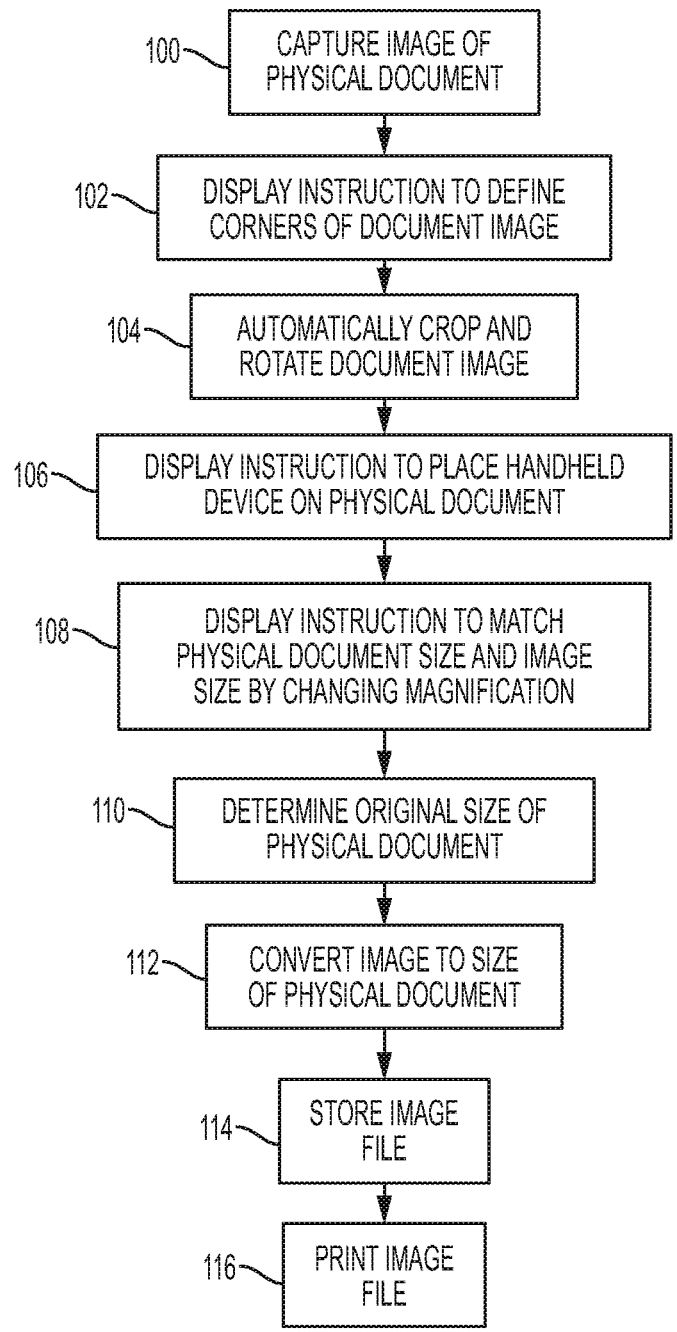
FIG. 1 is a flow diagram of various methods herein.

In greater detail, FIG. 1 is flowchart illustrating exemplary methods in greater detail, and such methods can be implemented through an application running on a user's handheld device, for example. In item 100, these methods record an electronic document image of a document captured using a camera of a handheld device. This is also shown in FIG. 2, for example, where a user utilizes a handheld device 150 (such as a personal digital assistant (PDA), smart phone, camera, etc.) to take a picture of a physical document 140. As shown in FIG. 2, the user interface 152 of the handheld device 150 shows the picture that was taken. A portion of this picture includes an electronic document image 142 of the physical document 140. Note that, because these devices and methods resize and reorient the electronic image to match the size of the physical document 140, it is useful to have the user include the entire document page of the physical document 140 when capturing the electronic document image in item 100.

Figures 3, 4:
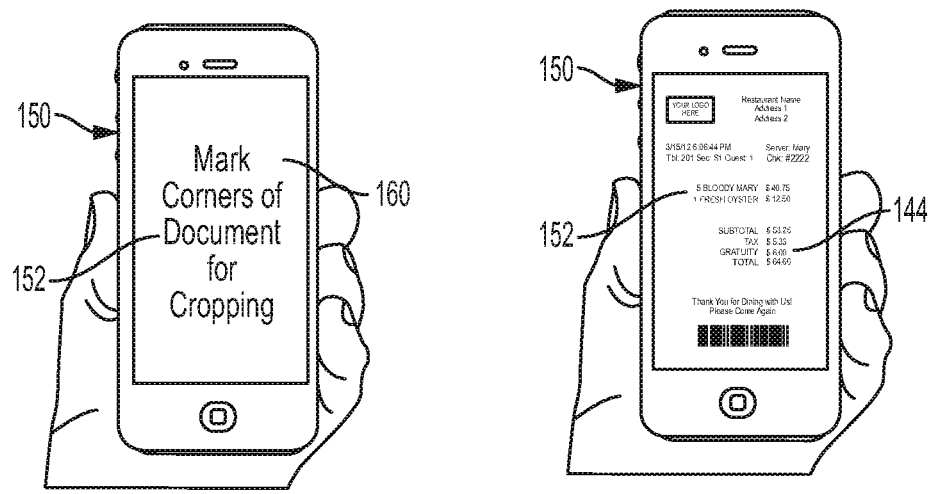
FIG. 3 is a schematic diagram illustrating devices and methods herein.
FIG. 4 is a schematic diagram illustrating devices and methods herein.

Referring again to FIG. 1, after recording the electronic document image in item 100, such methods cause (through the application running on the handheld device 150) the user interface to display the electronic document image and to display an instruction to the user to define the corners of the physical document in the electronic document image, as shown in item 102. As noted above, FIG. 2 illustrates the user interface 152 of the handheld device 150 displaying the electronic document image 142. FIG. 3 illustrates an exemplary message 160 that can be displayed on the user interface 152 of the handheld device, and such a message 160 instructs the user to mark the corners of the documents so that they can be cropped and rotated. Therefore, upon receipt of the message 160, shown in FIG. 3, the user can provide a number of different inputs to the user interface 152 of the handheld device 150 displaying the electronic document image 142 shown in FIG. 2, to define the corners of the electronic document image, including (but not limited to) touching the corners of the document image, drawing a box around the document image, adjusting X-axis and Y-axis lines to enclose a box around the document image, etc.

Referring again to FIG. 1, after the corners of the physical document in the electronic document image are defined in item 102, these methods can automatically crop and rotate the electronic document image to include only the physical document, using the processor, as shown in item 104. This cropping process produces the electronic document image 144 shown in FIG. 4.

Figure 5:
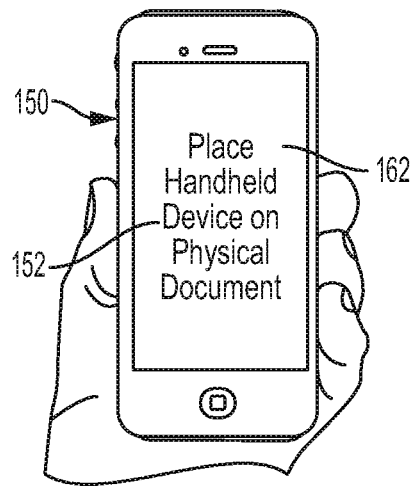
FIG. 5 is a schematic diagram illustrating devices and methods herein.
Figure 6:
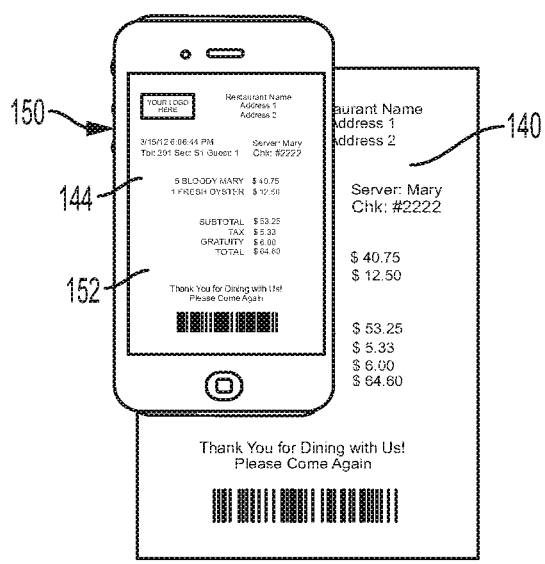
FIG. 6 is a schematic diagram illustrating devices and methods herein.

Further, in item 106, such methods cause (through the application) the user interface of the handheld device to display an instruction to place the handheld device on the physical document. FIG. 5 illustrates an exemplary message 162 displayed on the user interface 152 of the handheld device 150, where the message 162 instructs the user to place the handheld device on the physical document. FIG. 6 illustrates the handheld device 150 placed on top of the physical document 140. In the example shown in FIG. 6, the physical document 140 is in direct physical contact with the handheld device 150; however, the two do not need to be in direct physical contact, so long as the user interface 152 of the handheld device 150 is within very close proximity to the physical document 140 (e.g., less than 30 mm separation, less than 1 inch separation, or any other separation distance that allows the size of the electronic document image 142 to be matched with this size of the physical document 140 etc.).

Figure 7:
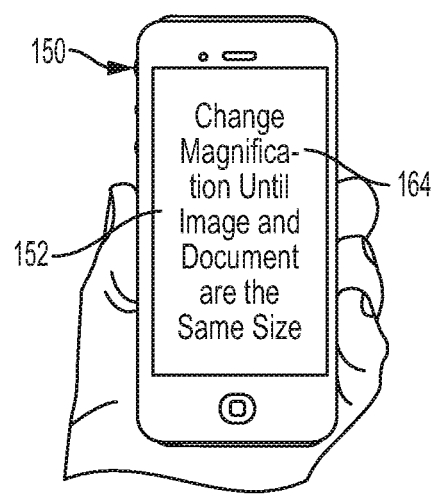
FIG. 7 is a schematic diagram illustrating devices and methods herein.

Additionally, in item 108, such methods cause (through the application) the user interface of the handheld device to display an instruction to change the magnification of the electronic document image on the user interface until the electronic document image and the physical document are the same size or appear to be the same size to the user (note that this may cause the user interface to display less than all of the electronic document image). FIG. 7 illustrates an exemplary message 164 displayed on the user interface 152 of the handheld device 150, where the message 164 instructs the user to change the magnification until the image and the document appear to be the same size.

FIG. 8 again illustrates the handheld device 150 placed on the physical document 140 and the arrows in the center of the user interface 152 show the action of the user increasing the magnification (zooming in) on a portion of the electronic document image 144 (note that this causes the user interface 152 to display less than all of the electronic document image 144).

As can be seen in FIG. 8, the size of the printed letters within the electronic document image 144 are (or appear to the user to be) the same as the size of the printed letters within the physical document 140 after the magnification is adjusted by the user. While printed letters are used in this example, graphic items, artwork, pictures, can similarly be size matched by the user adjusting the magnification of the electronic document image 144 on the user interface 152. In this way, the user adjusts the magnification until the size of the characters within the electronic document image 144 match (or appear to the user to match) the size of the characters on the physical document 140 (all while the handheld device 150 is resting on the physical document 140, and is therefore in very close proximity to the physical document 140).

As shown in item 110, these methods also automatically determine the original size (e.g., original dots per inch (DPI) size) of the physical document based on the magnification that made the electronic document image and the physical document the same size when the handheld device was on the physical document (e.g., using a processor of the handheld device).

Thus, because the user has adjusted the magnification of the electronic document image 144 to the point where the size of the characters or other items within the electronic document image 144 match the size of the characters on the physical document 140 as shown in FIG. 8, this allows the devices and methods herein to know how large the electronic document image 144 is relative to the physical document 140. This is shown graphically in FIG. 9 where X-coordinates and Y-coordinates determine the portion of the electronic document image 144 that is displayed on the user interface 152. This magnification is used to calculate the size of the physical document 140 by applying the magnitude of magnification to the known physical size of the user interface 152.

In other words, the devices and methods herein have previously determined the size of the user interface 152 (in terms of pixel count, physical area size ($mm^2$, $in^2$, etc.), etc.) based on empirical measurements or manufacturer specifications, which allows the methods and devices herein to calculate the size of the physical document 140 by applying a magnification factor (or ratio) to the physical size of the user interface 152. In one example, if the viewing portion of a user interface is 2 cm×4 cm, and only one-fourth of the document remained in the viewing portion of the user interface after the user increased magnification to cause the electronic document image to appear to match the size of the characters on the physical document (resulting in a magnification factor of 4×, a ratio of 4:1, etc.) the devices and methods herein automatically calculate that the original size of the physical document is four times the size of the user interface (e.g., 8 cm×16 cm). This allows the devices and methods herein to automatically resize the electronic document image to four times the size of the user face (e.g., 8 cm×16 cm) and thereby calculate the DPI of the electronic document image and store the same with the electronic document image.

In item 112, such methods convert the electronic document image into an original size document image file based on the original (e.g., DPI or physical measurement) size of the physical document, using the processor. Thus, these processes can store the resolution in terms of DPI in the scanned image header, for example. Therefore, the processing in item 112 creates a file (potentially with DPI in the scanned image header) that would be similar to a file produced by scanning the physical document 140 using a conventional scanner that has a full width array (FWA) scanner, such as a platen-based or flatbed scanner. Thus, after the processing in item 112, the file can have physical dimensions (height and width) and/or can have DPI measurements.

The original size document image file has the same (e.g., DPI) size as the physical document, and as shown in item 114 these methods can store the original-size document image file in a non-transitory, machine-readable electronic storage of the handheld device. Therefore, based on the ratio of the electronic image displayed to the size of the screen, the actual size of the document is calculated; and, based on the actual dimension and the pixel dimension of the image, the DPI of the image is estimated and stored.

Also, as shown in item 116, such methods can output the original size document image file from the handheld device to a printer to cause the printer to print the original size document image file to have the same size as the physical document. Such output from printing is shown in FIGS. 10 and 11 as printed items 170 and 172. Note that printed item 170 is printed on the same size paper as the physical document 140, while printed item 172 is printed on a larger sheet with the original size document image file utilizing less than the full printing area of the sheet shown as printed item 172.

The various sets of instructions that are executed by a computerized processor to perform the methods described herein can be any form of computerized application, such as an application program interface (API), a platform API workflow program, a specialty application, etc., all of which are referred to herein simply as "application" for shorthand.

Figure 12:
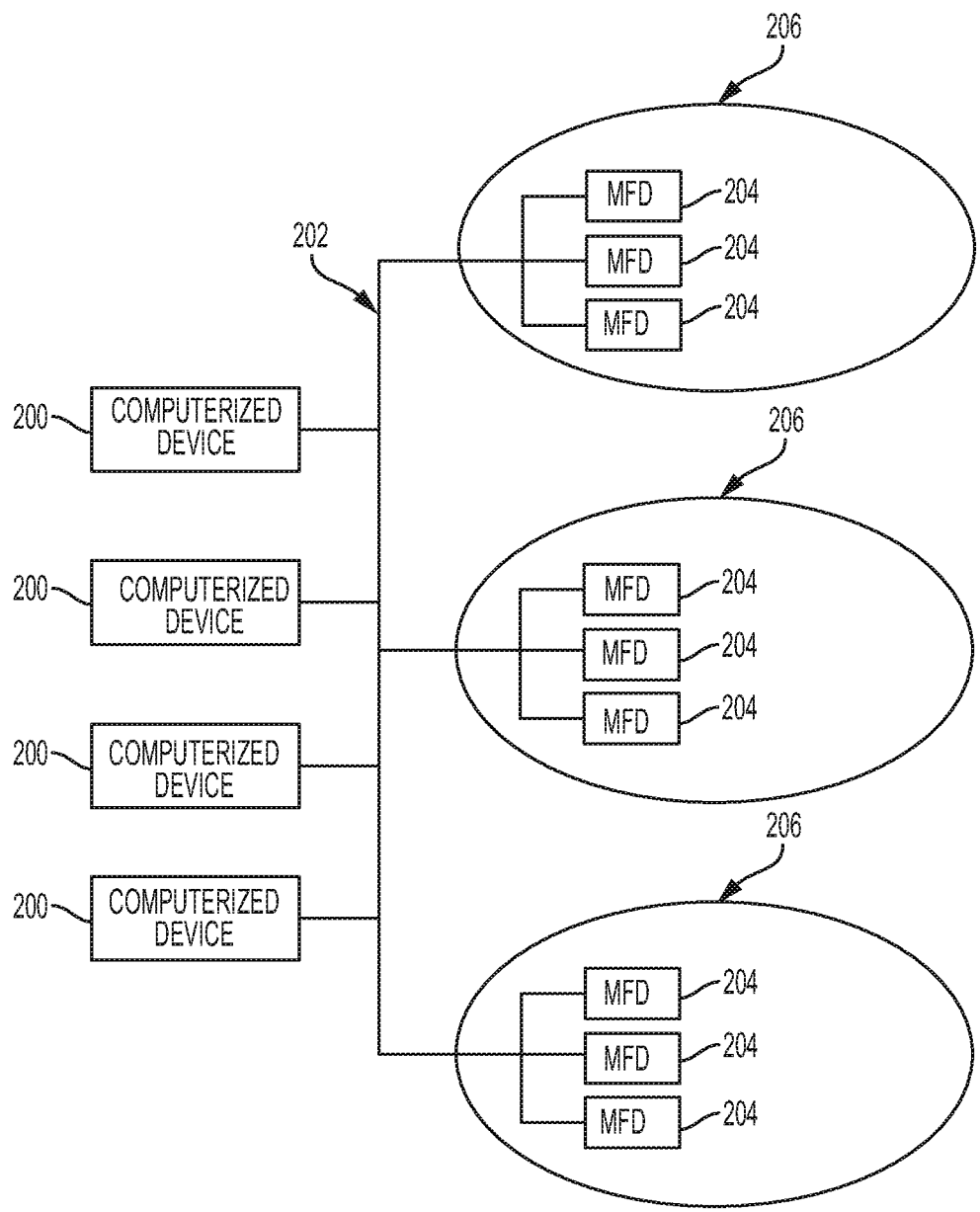
FIG. 12 is a schematic diagram illustrating systems herein.

As shown in FIG. 12, exemplary systems and methods herein include various computerized devices 200, 204 located at various different physical locations 206. The computerized devices 200, 204 can include print servers, printing devices, personal computers, handheld devices, etc., and are in communication (operatively connected to one another) by way of a local or wide area (wired or wireless) network 202. Thus, the processing described above can be done locally at the portable device, at a remote computerized device, or shared between such connected devices.

Figure 13:
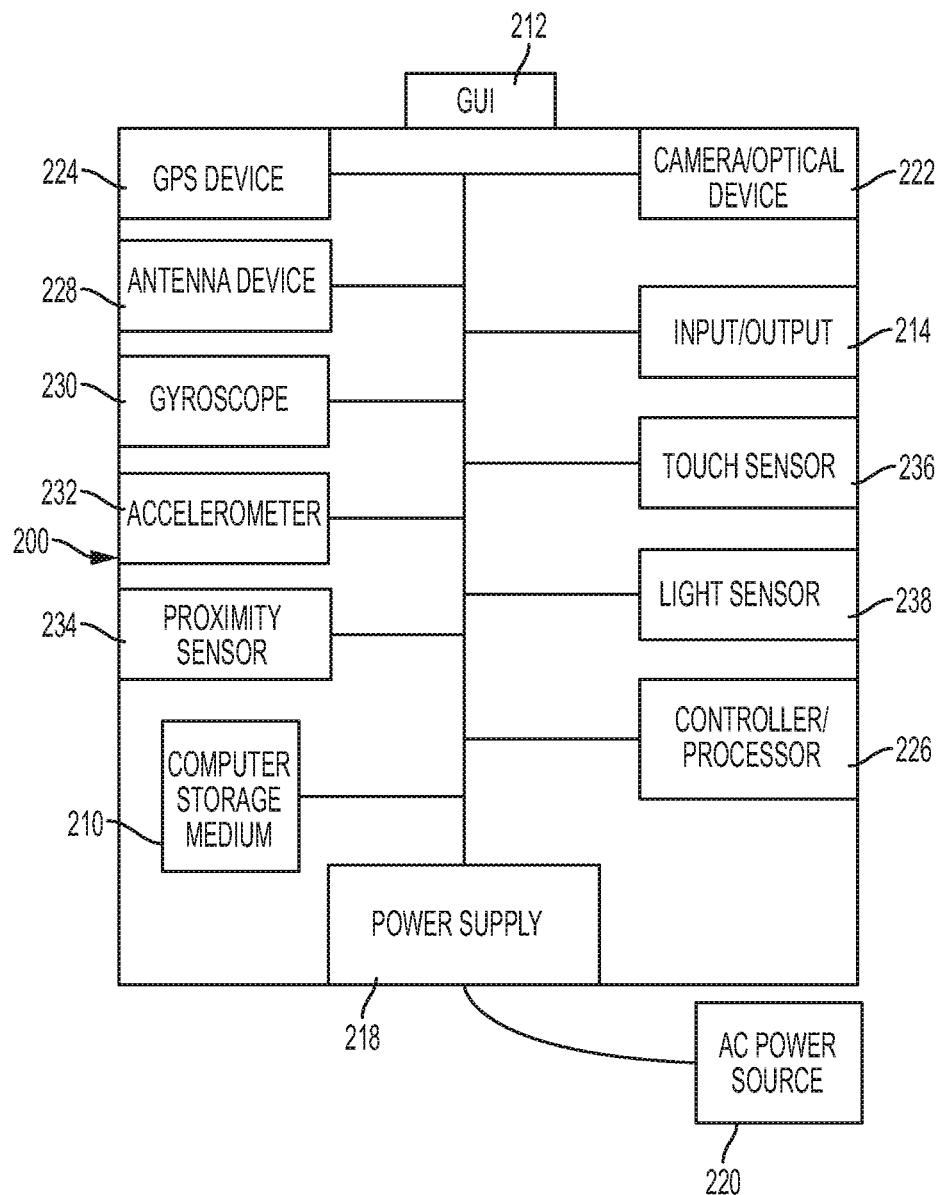
FIG. 13 is a schematic diagram illustrating computerized devices herein.

FIG. 13 illustrates a computerized device 200, which can be used with systems and methods herein and can comprise, for example, a handheld device, etc. The computerized device 200 includes a controller/tangible processor 226 and a communications port (input/output) 214 operatively connected to the tangible processor 226 and to the computerized network external to the computerized device 200. Also, the computerized device 200 can include at least one accessory functional component, such as a user interface or graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 226 controls the various actions of the computerized device. A non-transitory, tangible, machine-readable computer storage medium device 210 (which can be optical, magnetic, capacitor based, etc., and is different from a transitory signal) is readable by the tangible processor 226 and stores instructions that the tangible processor 226 executes to allow the computerized device to perform its various functions, such as those described herein. Thus, as shown in FIG. 13, a body housing has one or more functional components that operate on power supplied from an alternating current (AC) source 220 by the power supply 218. The power supply 218 can comprise a common power conversion unit, power storage element (e.g., a battery, etc), etc.

Thus, FIG. 13 illustrates that the computerized device 200, can be a special-use device such as a smartphone, tablet, or other special-purpose portable computerized element that is easily carried by a user. Such devices are special-purpose devices distinguished from general-purpose computers because such devices include specialized hardware, such as: specialized processors 226 (e.g., containing specialized filters, buffers, application specific integrated circuits (ASICs), ports, etc.) that are specialized for high G-force usage, for high electromagnetic field interference, for phone communications, for use with cellular networks, etc.; specialized graphic user interfaces 212 (that are specialized for reduced power consumption, reduced size, antiglare, etc.); antenna 228 (that are specialized for phone communications, for use with cellular networks, etc.); specialized converters; GPS equipment 224; cameras and optical devices 222 (that are specialized for obtaining images with camera components, have specialized batteries, have specialized protective cases for use in harsh environments, etc.); gyroscopes 230; accelerometers 232; proximity sensors 234; touch sensors 236; light sensors 238, etc.

As would be understood by one ordinarily skilled in the art, the processes described herein cannot be performed by a human alone (or one operating with a pen and a pad of paper) and instead such processes can only be performed by a machine having a camera, a user interface allowing the user to interact with and manipulate an electronic image, etc. Specifically, processes such as capturing electronic images, changing the magnification of such images, calculating the size of a physical document based upon the amount of magnification produced by the user interaction with the user interface, etc., requires the utilization of different specialized machines and cannot be performed by humans.

The hardware described herein plays a significant part in permitting the foregoing method to be performed, rather than function solely as a mechanism for permitting a solution to be achieved more quickly, (i.e., through the utilization of a computer for performing calculations). Further, such machine-only processes are not mere "post-solution activity" because, for example, the camera mechanism captures the image, the user interface allows the user to alter the magnification, and all such processes are integral to the process as described herein and are not activities of that merely occur before or after (or incidentally with) the processing described herein. In other words, various machines are integral with the methods herein because the methods cannot be performed without the machines (and cannot be performed by humans alone).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A handheld apparatus comprising:
a processor;
a camera operatively connected to said processor;
a user interface operatively connected to said processor; and
a communication device operatively connected to said processor,
said camera capturing an electronic document image of a physical document through user operation,
said user interface displaying an instruction to place said handheld apparatus on said physical document and to change the magnification of said electronic document image on said user interface while said handheld apparatus is resting on said physical document until said electronic document image and said physical document are the same size,
said processor determining the original size of said physical document based on said magnification to make said electronic document image and said physical document the same size when said handheld apparatus is resting on said physical document,
said processor converting said electronic document image into an original-size document image file based on said original size of said physical document, and
said communication device outputting said original size document image file to a printer to cause said printer to print said original size document image file to have the same size as said physical document.

2. The handheld apparatus according to claim 1, after said camera capturing said electronic document image, said user interface displaying said electronic document image and displaying an instruction to define corners of said physical document in said electronic document image.

3. The handheld apparatus according to claim 2, after said corners of said physical document in said electronic document image are defined, said processor automatically cropping said electronic document image to include only said physical document.

4. The handheld apparatus according to claim 1, said user interface displaying less than all of said electronic document image when said magnification of said electronic document image on said user interface is changed to make said electronic document image and said physical document the same size.

5. The handheld apparatus according to claim 1, further comprising a non-transitory, machine-readable electronic storage operatively connected to said processor, said processor storing said original-size document image file in said non-transitory, machine-readable electronic storage.

6. A handheld apparatus comprising:
a processor;
a camera operatively connected to said processor;
a user interface operatively connected to said processor; and
a communication device operatively connected to said processor,
said camera capturing an electronic document image of a physical document through user operation,
said user interface displaying an instruction to place said handheld apparatus on said physical document and to change the magnification of said electronic document image on said user interface while said handheld apparatus is resting on said physical document until said electronic document image and said physical document are the same size,
said processor determining the original dots per inch (DPI) size of said physical document based on said magnification to make said electronic document image and said physical document the same size when said handheld apparatus is resting on said physical document,
said processor converting said electronic document image into an original size document image file based on said original DPI size of said physical document,
said original size document image file having the same DPI size as said physical document,
said communication device outputting said original size document image file to a printer to cause said printer to print said original size document image file to have the same size as said physical document.

7. The handheld apparatus according to claim 6, after said camera capturing said electronic document image, said user interface displaying said electronic document image and displaying an instruction to define corners of said physical document in said electronic document image.

8. The handheld apparatus according to claim 7, after said corners of said physical document in said electronic document image are defined, said processor automatically cropping said electronic document image to include only said physical document.

9. The handheld apparatus according to claim 6, said user interface displaying less than all of said electronic document image when said magnification of said electronic document image on said user interface is changed to make said electronic document image and said physical document the same size.

10. The handheld apparatus according to claim 6, further comprising a non-transitory, machine-readable electronic storage operatively connected to said processor, said processor storing said original-size document image file in said non-transitory, machine-readable electronic storage.

11. A method comprising:
recording an electronic document image of a physical document captured using a camera of a handheld device;
causing a user interface of said handheld device to display an instruction to place said handheld device on said physical document and to change the magnification of said electronic document image on said user interface while said handheld device is resting on said physical document until said electronic document image and said physical document are the same size;
automatically determining the original size of said physical document based on said magnification to make said electronic document image and said physical document the same size when said handheld device is resting on said physical document, using a processor of said handheld device;
converting said electronic document image into an original-size document image file based on said original size of said physical document, using said processor; and
outputting said original size document image file from said handheld device to a printer and causing said printer to print said original size document image file to have the same size as said physical document.

12. The method according to claim 11, said method further comprising, after said recording said electronic document image, causing said user interface to display said electronic document image and to display an instruction to define corners of said physical document in said electronic document image.

13. The method according to claim 12, said method further comprising, after said corners of said physical document in said electronic document image are defined, automatically cropping said electronic document image to include only said physical document, using said processor.

14. The method according to claim 11, further comprising causing said user interface to display less than all of said electronic document image when said magnification of said electronic document image on said user interface is changed to make said electronic document image and said physical document the same size.

15. The method according to claim 11, further comprising storing said original-size document image file in a non-transitory, machine-readable electronic storage of said handheld device.

16. A method comprising:
recording an electronic document image of a physical document captured using a camera of a handheld device;
causing a user interface of said handheld device to display an instruction to place said handheld device on said physical document and to change the magnification of said electronic document image on said user interface while said handheld device is resting on said physical document until said electronic document image and said physical document are the same size;
automatically determining the original dots per inch (DPI) size of said physical document based on said magnification to make said electronic document image and said physical document the same size when said handheld device is resting on said physical document, using a processor of said handheld device;
converting said electronic document image into an original size document image file based on said original DPI size of said physical document, using said processor, said original size document image file having the same DPI size as said physical document; and
outputting said original size document image file from said handheld device to a printer and causing said printer to print said original size document image file to have the same size as said physical document.

17. The method according to claim 16, said method further comprising, after said recording said electronic document image, causing said user interface to display said electronic document image and to display an instruction to define corners of said physical document in said electronic document image.

18. The method according to claim 17, said method further comprising, after said corners of said physical document in said electronic document image are defined, automatically cropping said electronic document image to include only said physical document, using said processor.

19. The method according to claim 16, further comprising causing said user interface to display less than all of said electronic document image when said magnification of said electronic document image on said user interface is changed to make said electronic document image and said physical document the same size.

20. The method according to claim 16, further comprising storing said original-size document image file in a non-transitory, machine-readable electronic storage of said handheld device.

\* \* \* \* \*